(12) United States Patent
Bankston et al.

(10) Patent No.: US 8,370,828 B2
(45) Date of Patent: *Feb. 5, 2013

(54) TECHNIQUES TO PERFORM GRADUAL UPGRADES

(75) Inventors: John Keith Bankston, Redmond, WA (US); Ziyi Wang, Redmond, WA (US); Corey M. Roussel, Redmond, WA (US); Joel M. Fillmore, Redmond, WA (US); Kshamta Jerath, Redmond, WA (US); Kimon Tsinteris, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 16 days.

This patent is subject to a terminal disclaimer.

(21) Appl. No.: 12/893,263

(22) Filed: Sep. 29, 2010

(65) Prior Publication Data

US 2011/0016461 A1 Jan. 20, 2011

Related U.S. Application Data

(63) Continuation of application No. 11/418,747, filed on May 5, 2006, now Pat. No. 7,818,740.

(51) Int. Cl.
*G06F 9/44* (2006.01)
(52) U.S. Cl. ........ 717/173; 717/122; 717/169; 717/170; 717/175; 717/178; 707/638; 707/781; 707/782
(58) Field of Classification Search .................. None
See application file for complete search history.

(56) References Cited

U.S. PATENT DOCUMENTS

| | | | | | |
|---|---|---|---|---|---|
| 5,768,519 | A * | 6/1998 | Swift et al. | ............. | 709/223 |
| 6,052,531 | A * | 4/2000 | Waldin et al. | ............. | 717/170 |
| 6,332,158 | B1 * | 12/2001 | Risley et al. | ............. | 709/219 |
| 6,377,960 | B1 * | 4/2002 | Qiu et al. | ............. | 1/1 |
| 6,633,878 | B1 * | 10/2003 | Underwood | ............. | 1/1 |
| 6,704,873 | B1 * | 3/2004 | Underwood | ............. | 726/12 |
| 6,996,589 | B1 * | 2/2006 | Jayaram et al. | ............. | 1/1 |
| 7,117,482 | B2 * | 10/2006 | Nguyen et al. | ............. | 717/122 |
| 7,356,577 | B2 * | 4/2008 | Collins | ............. | 709/221 |
| 7,356,679 | B1 * | 4/2008 | Le et al. | ............. | 713/1 |
| 8,069,407 | B1 * | 11/2011 | Armandpour et al. | ............. | 715/234 |
| 2001/0008024 | A1 * | 7/2001 | Inaba | ............. | 717/11 |
| 2003/0009537 | A1 * | 1/2003 | Wang | ............. | 709/219 |
| 2004/0031030 | A1 * | 2/2004 | Kidder et al. | ............. | 717/172 |
| 2004/0236799 | A1 * | 11/2004 | Apte et al. | ............. | 707/203 |
| 2005/0010913 | A1 * | 1/2005 | Chen | ............. | 717/168 |
| 2005/0246389 | A1 * | 11/2005 | Shah et al. | ............. | 707/200 |
| 2006/0031404 | A1 * | 2/2006 | Kassab | ............. | 709/218 |
| 2006/0075398 | A1 * | 4/2006 | Bennett et al. | ............. | 717/170 |
| 2006/0080656 | A1 * | 4/2006 | Cain et al. | ............. | 717/174 |
| 2009/0276771 | A1 * | 11/2009 | Nickolov et al. | ............. | 717/177 |
| 2009/0300093 | A1 * | 12/2009 | Griffiths et al. | ............. | 709/202 |
| 2009/0300596 | A1 * | 12/2009 | Tyhurst et al. | ............. | 717/173 |
| 2010/0211552 | A1 * | 8/2010 | Sidman | ............. | 707/687 |
| 2010/0217771 | A1 * | 8/2010 | Nash | ............. | 707/769 |

OTHER PUBLICATIONS

Title: Study and comparison of schema versioning and database conversion techniques for bi-temporal databases: author: Han-Chieh Wei, dated: 1999 source: IEEE.*

* cited by examiner

*Primary Examiner* — Chameli Das

(57) ABSTRACT

Techniques to perform gradual upgrades are described. An apparatus may include a database with a data set for a first version of an application program, and a computing device to couple to the database. The computing device may have a processor and memory, with the memory to store a first version of an application program, an installer program, and a gradual update engine. The processor may execute the installer program to install a second version of the application program, and said gradual update engine to convert the data set to a data schema used by the second version one data segment at a time. Other embodiments are described and claimed.

16 Claims, 5 Drawing Sheets

TECHNIQUES TO PERFORM GRADUAL UPGRADES

The present application is a continuation of Ser. No. 11/418,747, now U.S. Pat. No. 7,818,740 U.S. patent application No. 2007/0,261,049, filed May 5, 2006, which is hereby incorporated by reference in its entirety.

BACKGROUND

Software applications periodically have new version releases with improved features. Upgrading a software application to a new version may involve converting user data from an existing data schema to a new data scheme used by the new version. In some cases, the volume of user data may be so great that upgrade operations may cause a device or network to become unavailable for extended periods of time. For example, a server-based software application may have user data on the order of terabytes, which may take days or even weeks to upgrade to a new data schema. Mission-critical business systems or high-availability systems may find such extended periods of down time unacceptable. Consequently, improvements to upgrade techniques may be needed to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to upgrade techniques to gradually upgrade a software application to a new version of the software application. In some embodiments, a gradual upgrade technique may be used to update portions of an application program and/or data set for the application program in stages. In one embodiment, for example, an installer program may be arranged to install a new version of an application program on the same or similar hardware platform as a previous version of the application program. A gradual update engine may be arranged to convert a data set for a previous version of the application program to a new data schema used by the new version of the application program. More particularly, the gradual update engine may convert the data set in phases one data segment at a time. In this manner, a client may access other data segments of the previous version during conversion operations, thereby granting limited use of the application program rather than rendering the application program completely unavailable. Other embodiments are described and claimed.

DETAILED DESCRIPTION

Various embodiments may be generally directed to upgrade techniques for software applications. In particular, various embodiments may be directed to gradual upgrade techniques where an application program may be upgraded in stages to reduce outage time and the potential impact to clients and/or users. This may be particular important for large scale enterprise networks using server-based web application programs, such as those used to provide web hosting services, for example. Furthermore, gradual upgrade techniques may allow clients to continue accessing portions of a server-based web application program during the upgrade process. Such limited access may be particularly important for mission-critical and high-availability applications. As a result, network administrators may experience reduced tasks and expenses when upgrading software applications for a device or network, and users may experience a more seamless transition to upgraded applications and services.

Figure 1:
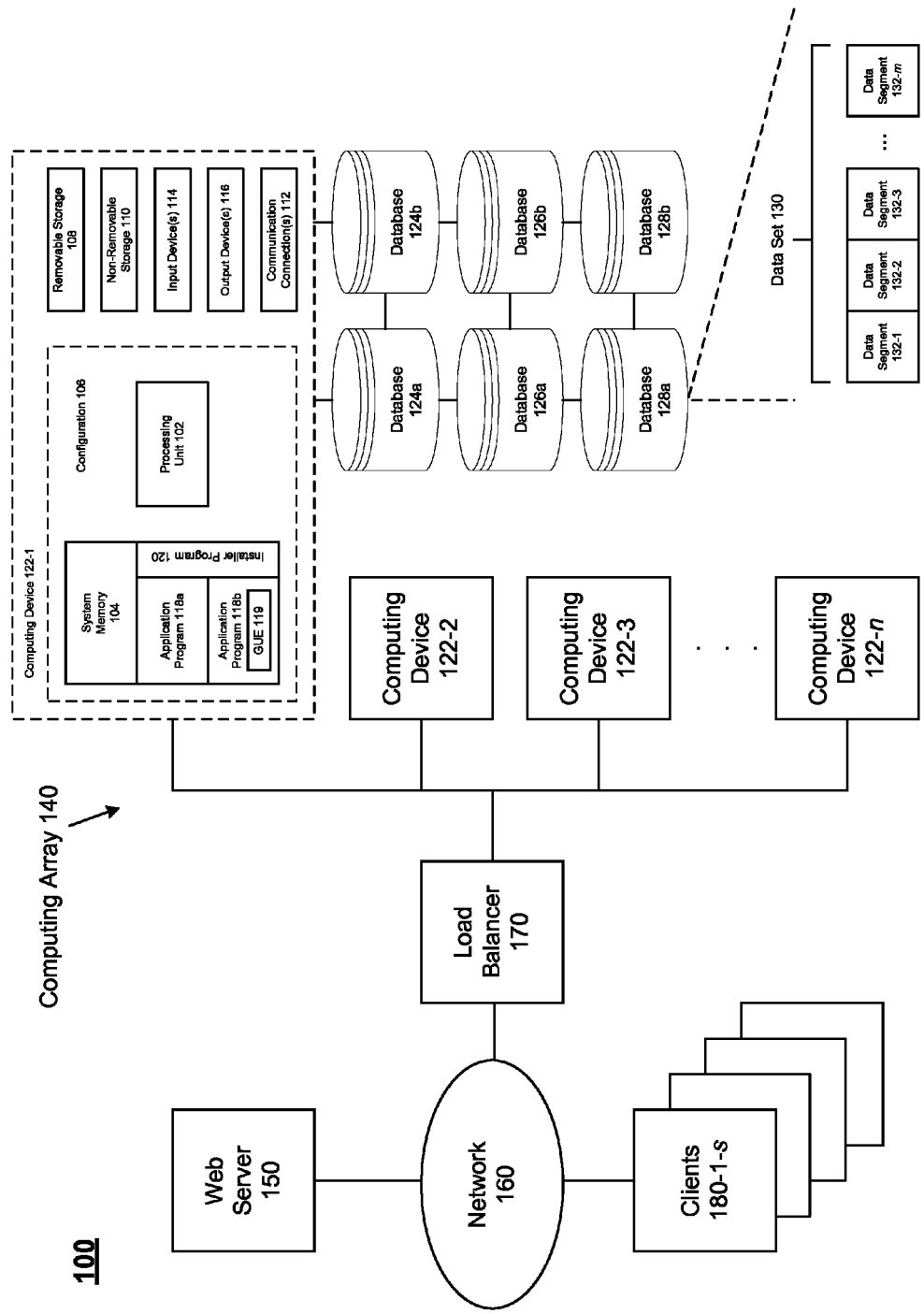
FIG. 1 illustrates an exemplary embodiment of a network.

FIG. 1 illustrates one exemplary embodiment of a network. FIG. 1 illustrates a block diagram for a network 100. Network 100 may represent a general network architecture suitable for implementing various embodiments. Network 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although network 100 as shown in FIG. 1 has a limited number of elements in a certain topology, it may be appreciated that network 100 may include more or less elements in alternate topologies as desired for a given implementation. The embodiments are not limited in this context.

As shown in FIG. 1, for example, network 100 may comprise various elements such as a computing array 140, a server 150, a network 160, a load balancer 170, and client devices 180-1-s. In one embodiment, for example, server 150 may be implemented as a web server. A web server may comprise a computing device capable of accepting Hypertext Transfer Protocol (HTTP) requests from client devices (e.g., clients 180-1-s and/or computing devices 122-1-n) to serve web pages. Web pages are typically documents generated using some form of markup language, such as the Hypertext Markup Language (HTML), the Extensible Markup Language (XML), Extensible Hypertext Markup Language (XHTML), MICROSOFT WORD® Markup Language (WordML), and so forth. Network 160 may comprise a packet network using one or more Internet Protocols, such as the Transmission Control Protocol and Internet Protocol (TCP/IP). Load balancer 170 may comprise a device to assign work loads to a set of networked computer servers (e.g., computing array 140) in such a manner that the computing resources are used in an efficient manner. Load balancer 170 may be implemented using, for example, a computer, a server, a virtual server, a network appliance, and so forth.

In various embodiments, computing array 140 may include multiple computing devices 122-1-n. Examples of computing devices 122-1-n may include, but are not necessarily limited to, a computer, a computer system, a computer sub-system, a workstation, a terminal, a server, a web server, a virtual server, a personal computer (PC), a desktop computer, a laptop computer, an ultra-laptop computer, a portable computer, a handheld computer, a personal digital assistant (PDA), a mobile computing device, and any other electronic, electromechanical, or electrical device. The embodiments are not limited in this context.

In one embodiment, for example, computing array 140 may be implemented as a server farm, wherein computing devices 122-1-n each represent a server, virtual server, virtual machine, single board computer (SBC), server blade, web server, and so forth. A server farm is typically a collection of computer servers usually maintained by an enterprise to accomplish server needs beyond the capability of one machine. Often, server farms will have both a primary and a backup server allocated to a single task, so that in the event of the failure of the primary server, a backup server will take over the functions of the primary server. Server farms are commonly used, for example, to provide web hosting services. A web hosting service is a type of Internet hosting service that provides individuals and organizations with online systems for storing information, images, video, audio, text, animations, movies, pictures, or any other form of web content accessible via the World Wide Web (WWW or "web"). Web hosts are companies that provide space on a server they own for use by their clients as well as providing Internet connectivity, typically in a data center. Web hosts can also provide data center space and connectivity to the Internet for servers they do not own to be located in their data center.

FIG. 1 further illustrates a more detailed block diagram of computing device 122-1. Computing device 122-1 may be representative of any computing devices 122-1-n. In its most basic configuration 106, computing device 122-1 typically includes at least one processing unit 102 and memory 104. Memory 104 may be implemented using any machine-readable or computer-readable media capable of storing data, including both volatile and non-volatile memory. For example, memory 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 1, memory 104 may store various software programs, such as one or more application programs 118, a gradual update engine (GUE) 119, an installer program 120, and accompanying data.

Computing device 122-1 may also have additional features and/or functionality beyond configuration 106. For example, computing device 122-1 may include removable storage 108 and non-removable storage 110, which may also comprise various types of machine-readable or computer-readable media as previously described. Computing device 122-1 may also have one or more input devices 114 such as a keyboard, mouse, pen, voice input device, touch input device, and so forth. One or more output devices 116 such as a display, speakers, printer, and so forth may also be included in computing device 122-1 as well.

Computing device 122-1 may further include one or more communications connections 112 that allow computing device 122-1 to communicate with other devices. Communications connections 112 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Each of computing devices 122-1-n may include multiple databases. As shown in detail with respect to computing device 122-1, computing device 122-1 may be coupled to databases 124a, 124b, 126a, 126b, 128a, and 128b. Each database may be arranged to store various types of data for computing device 122-1 in general, and application programs 118a, 118b in particular. In one embodiment, for example, configuration databases 124a, 124b may store configuration data for application programs 118a, 118b. Configuration database 124a may store configuration data for a first version of application program 118 (e.g., application program 118a), while configuration database 124b may store a converted set of configuration data for a second version of application program 118 (e.g., application program 118b). In one embodiment, for example, user profile databases 126a, 126b may store search and user profile data for application programs 118a, 118b. User profile database 126a may store search and user profile data for application program 118a, while user profile database 126b may store a converted set of configuration data for application program 118b. In one embodiment, for example, content databases 128a, 128b may store user data or content data for application programs 118a, 118b. Content database 128a may store content data for application program 118a, while content database 128b may store a converted set of content data for application program 118b. Other types of data and databases may be implemented with computing device 122-1, and the embodiments are not limited in this context.

In various embodiments, each version of application program 118 may use different data schemas for the configuration data, search and user profile date, and/or content data. A data schema may be a model to define various data characteristics, such as a data type, data structure, data format, content, semantics, syntax, and so forth. Different versions of a software application may use different data schemas. Consequently, the data stored by the various databases coupled to computing device 122-1 may need to be converted between different data schemas during any upgrade operations. For example, databases 124a, 126a, and 128a may store data according to a first data schema suitable for use with application program 118a, while databases 124b, 126b, and 128b may store converted data from databases 124a, 126a, and 128a, respectively, according to a second data schema suitable for use with application program 118b. The embodiments are not limited in this context.

By way of example, content database 128a may include a data set 130 for application program 118a. Data set 130 may comprise multiple subsets of data referred to as data segments 132-1-m. A data segment may represent any defined or discrete set or subset of data. For example, a data segment may correspond to a data subset for a given web portal or set of hierarchical web portals hosted by WSS Version 2.0. Each of data segments 132-1-m may have varying sizes or uniform sizes as desired for a given implementation. Data set 130 may also be stored in accordance with a first data schema appropriate for application program 118a.

In general operation, network 100 may be arranged to perform gradual upgrade operations for one or more application programs stored or executed by one or more computing devices 122-1-n of computing array 140. Assume computing device 122-1-n each implements one or more application programs 118, such as a server-based web application program. One example of a server-based web application program may include a WINDOWS® SHAREPOINT® SERVICES (WSS) Version 2.0 application program made by MICROSOFT® Corporation. WSS Version 2.0 is a suite of integrated application programs that provides basic team services, web portal and intranet functionality for various clients, such as clients 180-1-s, for example. User data or content data for WSS Version 2.0 may be stored by content database 128a as indicated by data set 130. Although some embodiments may be described with reference to a WSS application program or suite of application programs by way of example, it may be appreciated that any application program executed by a single or multiple computing devices may be upgraded using the gradual update techniques described herein. The embodiments are not limited in this context.

At some point, assume development for WSS Version 3.0 is complete and it has been released for general use. The administrator for computing array 140 may desire to upgrade one or more computing devices 122-1-n of computing array 140 from WSS Version 2.0 to WSS Version 3.0. To accomplish this, an administrator may select one of the computing devices 122-1-n such as computing device 122-1 to access web server 150 via network 160 to download an installation package with WSS Version 3.0, a gradual update engine 119, an installer 120, and accompanying data and instructions. Alternatively, computing device 122-1 may load the installation package via an input device 114, such as a CD-ROM device. Computing device 122-1 may execute the installation package to copy the installation components to memory 104, including gradual update engine 119.

Processing unit 102 may execute installer program 120 to install a new version of application program 118a (e.g., application program 118b) for use by computing device 122-1. Application program 118b may comprise, for example, WSS Version 3.0. Installer program 120 may further install gradual update engine 119 as an integrated or separate part of application program 118b. Gradual update engine 119 may be arranged to manage upgrade operations for application program 118. A graphic user interface may provide a number of upgrade options to an administrator via output device 116, such as a monitor or other type of display. The upgrade options may include, among other options, an in-place upgrade or a gradual upgrade. The in-place upgrade may be the easiest approach since all computing devices 122-1-n are taken offline, upgraded, and then placed back into operation once update operations have completed. The cost of an in-place upgrade, however, is that the entire computing array 140 may be offline for a relatively long period of time. For example, assume computing array 140 is a server farm for a web hosting provider hosting 10,000 web sites. Assuming an upgrade time of 1 minute per site, it would take approximately 10,000 minutes or roughly one week to complete upgrade operations. By way of contrast, the gradual upgrade may introduce additional complexity in upgrade operations, but will allow portions of computing array 140 to maintain WSS operations during the upgrade cycle thereby providing some limited functionality to client devices 180-1-s.

To perform a gradual upgrade of computing array 140, gradual update engine 119 may initially perform gradual upgrade operations for computing device 122-1. Once upgrade operations are completed for computing device 122-1, the installation package may be passed to computing device 122-2 to perform similar upgrade operations. This process continues through computing device 122-n until the last computing device in computing array 140 has finally been upgraded.

As part of the upgrade operations for application program 118 of computing device 122-1, gradual update engine 119 may begin converting the various types of information or data from the various databases for use with the second version of application program 118 (e.g., application program 118b). For example, gradual update engine 119 may begin retrieving and converting content data from content database 128a as represented by data set 130 from a first data schema used by application program 118a to a second data schema used by application program 118b. The converted data set 130 may be stored in database 128b for use by application program 118b.

Gradual update engine 119 may convert data set 130 in discrete portions or chunks as represented by data segments 132-1-m. More particularly, gradual update engine 119 may convert data set 130 one data segment at a time. For example, an administrator may select one or more data segments 132-1-m to convert to the second data schema. Further, the administrator may select an order by which data segments 132-1-m is to be converted. Assume the administrator selects data segment 132-1 to be converted first, followed by data segments 132-2, 132-3, and finally data segment 132-m. Gradual update engine 119 may begin converting data segment 132-1 to the second data schema in accordance with the desired selections and conversion order.

Gradual update engine 119 and/or the site administrator may select a given set of data segments 132-1-m based on a number of factors. For example, certain data segments 132-1-m may be selected to impact as few users as possible. To accomplish this, data segments 132-1-m may be selected on a per-site collection basis, which is a hierarchical group of web sites or web portals that are accessed by the same set of users and share permissions. In another example, certain data segments 132-1-m may be selected based on priority of a group of web sites. Data segments for higher priority web sites may be upgraded first followed by lower priority web sites, and vice-versa. In yet another example, certain data segments 132-1-m may be selected based on traffic. Data segments for higher traffic volume web sites may be upgraded first followed by lower traffic volume web sites, and vice-versa. In still another example, certain data segments 132-1-m may be selected based on an amount of time needed for conversion operations. Data segments requiring longer conversion periods may be selected for conversion operations during evening or weekend hours where traffic volumes are typically lower, while those with shorter conversion periods may be selected for conversion operations during daytime or work hours where traffic volumes are typically higher. It may be appreciated that these are merely a few examples, and any number of selection criteria may be used to select an order by which data segments 132-1-*m* are converted to the new data schema. The embodiments are not limited in this context.

While converting a particular data segment, gradual update engine 119 may lock the data segment to prevent any changes or modifications to the data segment. For example, while converting data segment 132-1, gradual update engine 119 may lock data segment 132-1 to prevent any changes to data segment 132-1. If changes are made to data segment 132-1 during conversion operations, data for such changes may not be converted to the WSS Version 3.0 data schema or potentially create merge conflicts. To prevent potential data loss or merge conflicts, gradual update engine 119 may allow read privileges but not write privileges to data segment 132-1. Alternatively, gradual update engine 119 may entirely block access to data segment 132-1 during conversion operations. In any event, only the users who frequent the particular data segment being converted should be impacted by the conversion operations. Gradual update engine 119 may release the lock once conversion operations for a given data segment are complete.

Although gradual update engine 119 may lock a given data segment during conversion operations, however, computing device 122-1 may allow one or more clients 180-1-*s* to access other data segments from data set 130. For example, assume a particular web portal uses data from data segment 132-2. A client 180-1 may continue to access the web portal using the WSS Version 2.0 application program even though gradual update engine 119 is converting data segment 132-1 to the new data schema. This allows continued use of WSS operations during the conversion operations. Similarly, once data segment 132-1 has been converted to the new data schema, computing device 122-1 may allow one or more clients 180-1-*s* to access the web portal using the WSS Version 3.0 application program and converted data segment 132-1 while other data segments are being converted. In this manner, clients may access WSS features from WSS Version 2.0 or WSS Version 3.0 based on a current conversion state for a given data segment 132-1-*m* of data set 130.

To reduce migration issues for clients 180-1-*s*, gradual update engine 119 may temporarily redirect access requests based on a status for conversion operations of a given data segment 132-1-*m*. To prepare for gradual upgrade operations, gradual update engine 119 may create new Universal Resource Locator (URL) domains for use during upgrade operations. For example, assume WSS Version 2.0 is located at first domain name "//domain." Gradual update engine 119 may create a second domain name of "//domain_old" for use by WSS Version 2.0. If a client 180-1-*s* sends an access request for a web site with the URL "//domain/sites/WSS," gradual update engine 119 may automatically redirect the access request to "//domain_old/sites/WSS" until upgrade operations have been completed. Meanwhile, gradual update engine 119 may install WSS Version 3.0 to the first domain "//domain" previously used by WSS Version 2.0. Once upgrade operations have been completed and validated for the entire computing array 140, gradual update engine 119 may cease redirect operations thereby providing a seamless transition for clients 180-1-*s* to the new version of application program 118. Redirecting user requests to ensure the original URL domain can be browsed both before and after upgrade operations potentially reduces the impact to end users since they do not have to learn a new URL domain. Gradual update engine 119 updates redirect operations coincident with upgrade operations to ensure the user is always transparently browsing to the correct and current location.

Once upgrade operations have been completed and data set 130 has been converted to the new data schema, gradual update engine 119 and/or the administrator may perform various validity or integrity checks to determine whether the upgrade was performed correctly. The previous version of application program 118 may remain at the temporary domain name during validation operations. If the upgrade was not performed correctly, gradual update engine 119 may re-initiate the redirect operations to redirect access requests to the previous version of application program 118 at the temporary domain name. The redirect operations may be made persistent until upgrade operations have been completed and validated to the satisfaction of the administrator of computing array 140.

Gradual update engine 119 may also operate with various APIs to allow other application programs to perform upgrade operations in conjunction with application program 118. For example, gradual update engine 119 may operate with various APIs to allow third party application programs to convert corresponding data sets in accordance with conversion operations for application program 118 and data set 130. The APIs may provide an extensibility model that allows third party applications developed to extend WSS Version 2.0 features to build onto the upgrade operations performed by gradual update engine 119. In this manner, third party applications may coordinate and build their upgrade actions into the main upgrade process. One example of a third party application built on top of WSS Version 2.0 may include a SharePoint Portal Server (SPS) 2003. The SPS 2003 may perform its upgrade operations coincident with the upgrade operations for WSS Version 2.0, thereby further reducing downtime for clients 180-1-*s* as well as administrative overhead. For example, computing devices 122-1-*n* using SPS 2003 may upgrade to Office SharePoint Services (OSS) 2006 at the same time as WSS Version 2.0 upgrades to WSS Version 3.0.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 2:
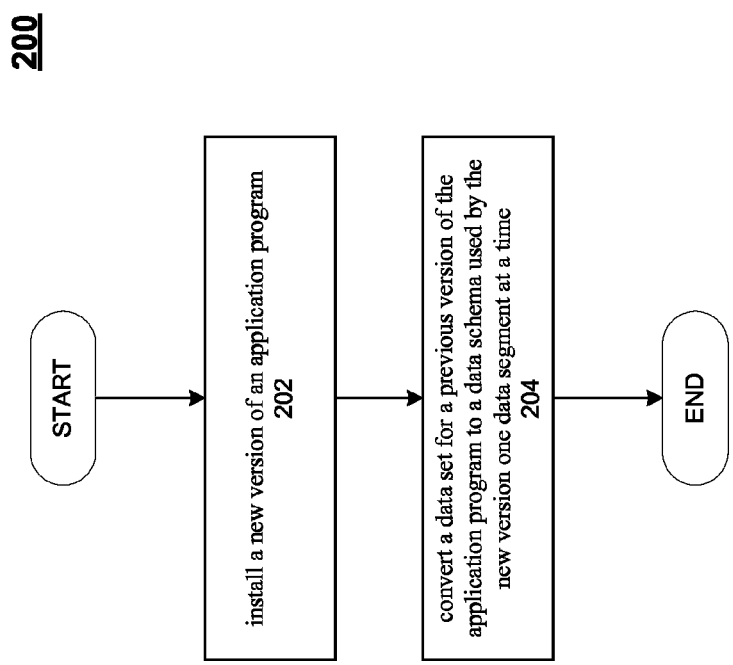
FIG. 2 illustrates an exemplary embodiment of a first logic flow.

FIG. 2 illustrates one embodiment of a logic flow. FIG. 2 illustrates a logic flow 200. Logic flow 200 may be representative of the operations executed by one or more embodiments described herein, such as network 100, computing devices 122, and/or gradual update engine 119. As shown in logic flow 200, a new version of an application program may be installed at block 202. A data set for a previous version of the application program may be converted to a data schema used by the new version one data segment at a time at block 204. The embodiments are not limited in this context.

In one embodiment, for example, a first data segment for the previous version may be converted to the data schema. Access to a second data segment for the previous version may be provided while converting the first data segment. The embodiments are not limited in this context.

In one embodiment, for example, a first data segment for the previous version may be converted to the data schema.

Access to the first data segment may be prevented during the conversion. The embodiments are not limited in this context.

In one embodiment, for example, a domain name for the previous version may be identified. A temporary domain name for the previous version may be created. The domain name may be renamed to the temporary domain name. Access requests with the domain name may be redirected to the temporary domain name. The embodiments are not limited in this context.

In one embodiment, for example, a domain name for the previous version may be identified. The domain name for the new version may be used once the data set has been converted. The embodiments are not limited in this context.

In one embodiment, for example, other application programs may convert corresponding data sets in accordance with converting the data set for the previous version using an API. The embodiments are not limited in this context.

In one embodiment, for example, a data segment may be selected having data from one or more content databases used by a web application. Alternatively, a data segment may be selected having data from one or more content databases used by a hierarchical group of web applications. The embodiments are not limited in this context.

The gradual update technique may have various advantages over conventional upgrade techniques. One advantage of a gradual update technique, for example, is that upgrade operations can be done in pieces that fit into a defined outage window, such as over a weekend, for example. The gradual update technique also allows a seamless migration from a working environment for a current version of a given application program 118 to a working environment for a new or upgraded version of the application program 118. The gradual upgrade technique further provides some tools to reduce the potential impact on users and work loads for administrators.

The performance and efficiency of a given gradual upgrade technique is based on a set of key assumptions. In one embodiment, for example, the gradual upgrade technique assumes that the old and new versions of application program 118 are running on the same server(s) simultaneously. For example, WSS Version 2.0 and WSS Version 3.0 may both be executed by computing device 122-1, while different databases and virtual servers exist for WSS Version 2.0 and WSS Version 3.0 content. In some cases, the virtual servers may be running different versions of ASP.Net. There may also be a number of sites served by both versions of application program 118. Users may be automatically directed to the proper domain after upgrade operations. The administrator will also upgrade some number of site collections at a time to the new database and application version. Finally, old-version data will be maintained, and it will be possible to revert or rollback any site collection to the pre-upgrade application version and accompanying data set.

Various design parameters and perform constraints may be used to build a set of performance requirements for gradual update engine 119 and/or application program 118. In one embodiment, for example, the requirement set may include enabling an install of WSS Version 3.0 onto a server farm that is currently running WSS Version 2.0, without breaking the WSS Version 2.0 installation. In another example, the requirement set may include creating a central administrative database and configuration database from the WSS Version 2.0 data, and then creating WSS Version 3.0 content virtual servers and content databases as needed for upgrade operations. In yet another example, the requirement set may allow administrators to upgrade one or more site collections, rather than the entire system or a database at a time. The data could be transferred to a temporary database where a full upgrade is performed, and the result moved into the live WSS Version 3.0 environment. Site collections will become unavailable or read-only for the duration of the upgrade process, and sites that are upgraded will have a new domain name. In still another example, the requirement set may provide tools for administrators to review the logs, results, and the upgraded WSS Version 3.0 site, then choose whether to set a redirect from WSS Version 2.0 to WSS Version 3.0, leave both temporarily available (e.g., WSS Version 2.0 would be read-only) and work on WSS Version 3.0, or re-activating WSS Version 2.0 for all updates and re-upgrading at a later date. In yet another example, the requirement set may include continuing upgrade operations until no WSS Version 2.0 sites remain in the environment. In essence, all WSS Version 2.0 sites are either upgraded or moved to another server farm. In some cases, the administrator may need to manually indicate the upgrade to be complete, and un-install WSS Version 2.0 to complete the process. Reports may be used to show what sites are in which state (e.g., WSS Version 3.0 with redirect, WSS Version 3.0 and WSS Version 2.0, or only WSS Version 2.0).

With respect to updating web applications such as WSS application programs, gradual upgrade operations may be generally categorized into 4 phases. A first phase includes WSS VERSION 2.0 upgrade preparation and WSS Version 3.0 farm creation. Code for the new version of application program 118 is installed, and global elements of WSS Version 2.0 are added to the WSS Version 3.0 environment on each computing device 122-1-$n$ in computing array 140. The administrator should perform any pre-upgrade work, and use a pre-upgrade report of WSS Version 2.0 sites and issues.

A second phase includes administrator-driven web application preparation. A new web application virtual server is created. A new content database is created to store the new sites on the same SQL server as the WSS Version 2.0 content database. Web parts deployed into the bin for the WSS Version 2.0 virtual server should be added to the WSS Version 3.0 virtual server by the administrator.

A third phase includes administrator-driven site collection upgrades. An administrator selects one or many sites to move to WSS Version 3.0. WSS Version 2.0 sites are off-line and unavailable, and all data is copied to a temporary database. An in-place upgrade is run in the temporary database, the result is then moved to the live WSS Version 3.0 environment, and the sites are made available in WSS Version 3.0. The WSS Version 2.0 sites should be made available again once upgrade operations are completed.

A fourth phase includes review and redirection. An administrator reviews the site. If the site requires significant work, or is not upgradeable, the redirect to the WSS Version 2.0 site is reset, and the administrator can optionally create a copy of the upgraded WSS Version 3.0 site. The WSS Version 3.0 copy would be worked on using a web site creation and management tool such as FRONTPAGE® made by Microsoft Corporation, or similar tool, until the user interface is correct within the WSS Version 3.0 environment. At that point, the WSS Version 2.0 site may be re-upgraded, and the changes merged manually using FrontPage or a similar tool.

Figure 3:
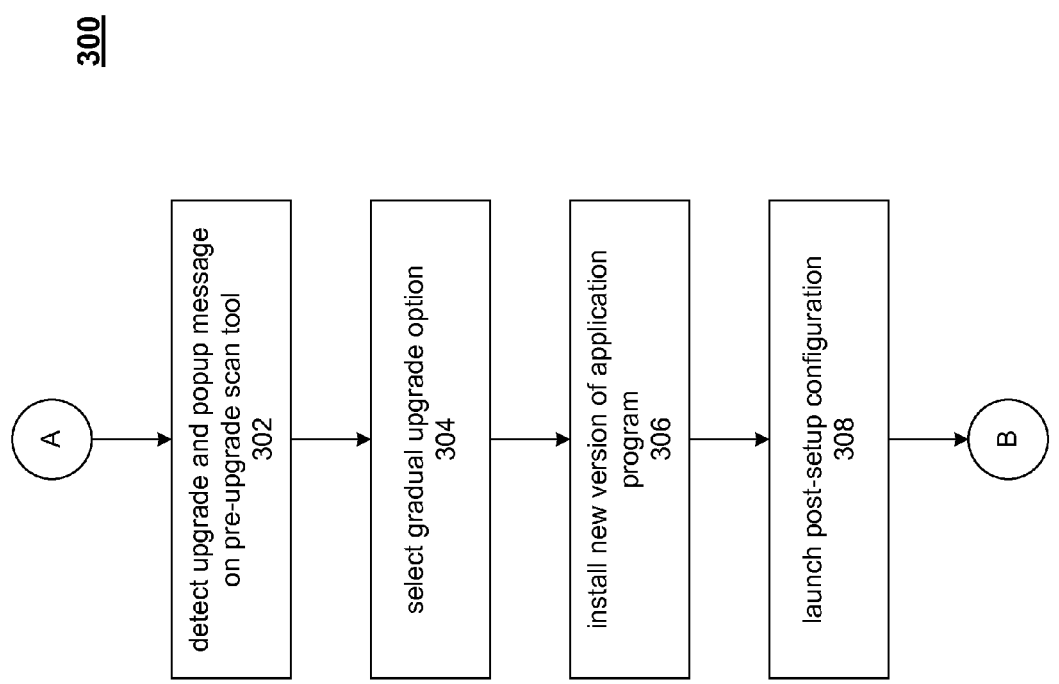
FIG. 3 illustrates an exemplary embodiment of a second logic flow.

FIG. 3 illustrates an exemplary embodiment of a second logic flow. FIG. 3 illustrates a logic flow 300 that may be representative of setup operations suitable for a gradual upgrade. As shown in logic flow 300, before initiating a gradual upgrade a pre-upgrade scan tool may be run in preparation for upgrade operations. The pre-upgrade scan tool may report common issues for an administrator to address, provide a list of all site definitions in use, update any WSS lists so they can be upgraded, and so forth. During execution of the pre-upgrade scan tool, an upgrade opportunity may be detected and conveyed to the administrator via a pop-up message at block 302, or via entries into a log file. A list of upgrade options may be presented to the administrator, such as an in-place upgrade, a gradual upgrade, a content migration upgrade, and so forth. A gradual upgrade may be selected at block 304. Computing device 122-1 may retrieve and load gradual update engine 119 to begin installing a new version of application program 118 at block 306. Post-setup configuration operations may be launched at block 308. At this point, control may be passed to logic flow 400 as indicated by circle B.

Figure 4:
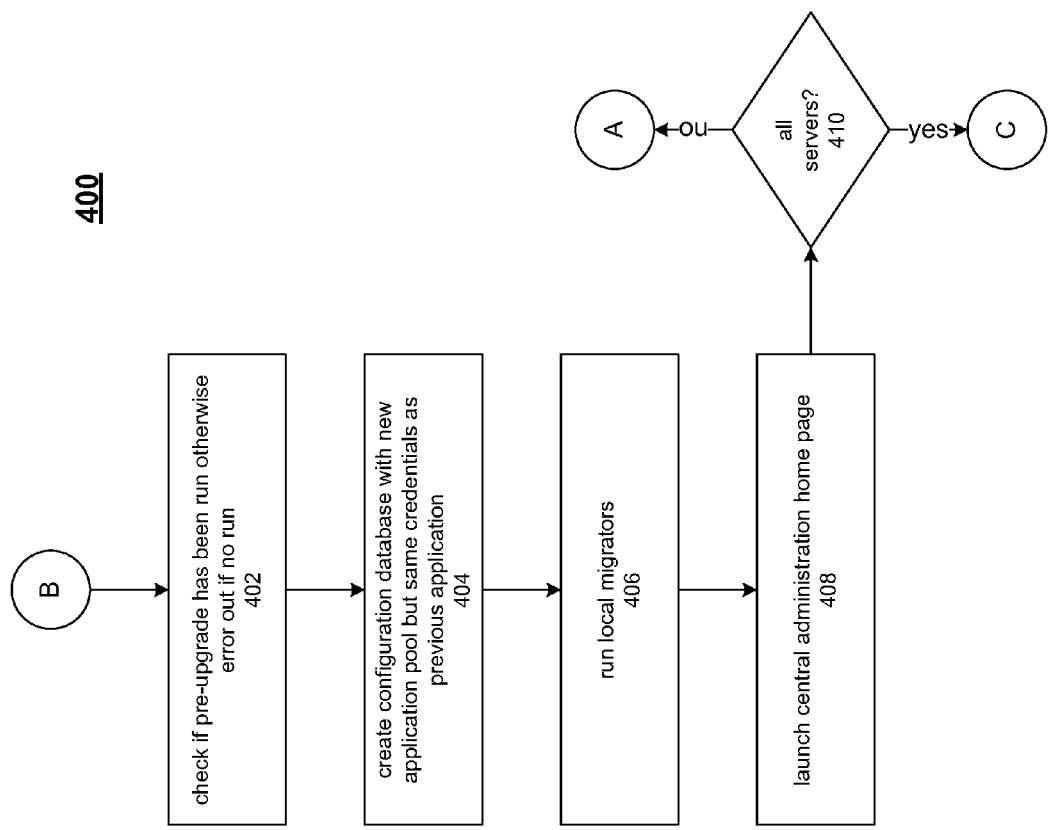
FIG. 4 illustrates an exemplary embodiment of a third logic flow.

FIG. 4 illustrates an exemplary embodiment of a third logic flow. FIG. 4 illustrates a logic flow 400 that may be representative of post-setup configuration operations suitable for a gradual upgrade. As shown in logic flow 400, a check is performed to determine whether the pre-upgrade scan tool has been used during setup operations at block 402. If the pre-upgrade scan tool has not been run then an error may be generated and upgrade operations are terminated or control is passed back to logic flow 300 to re-execute setup operations. If the pre-upgrade scan tool has been run then a configuration database may be created with a new application pool but with the same credentials as WSS Version 2.0 at block 404. Local migrators may be executed at block 406. An example of local migrators may include executing a local upgrade of data and software used for Search operations. A central administration home page may then be launched at block 408.

At diamond 410, a determination is made as to whether setup operations and post-setup configuration operations have been performed for all computing devices 122-1-*n* in computing array 140. If all setup operations and post-setup operations have not been performed for all computing devices 122-1-*n* in computing array 140, then control is passed to logic flow 300 as indicated by circle A. When setup operations and post-setup operations have been performed for all computing devices 122-1-*n*, however, then control is passed to logic flow 500 as indicated by circle C.

Figure 5:
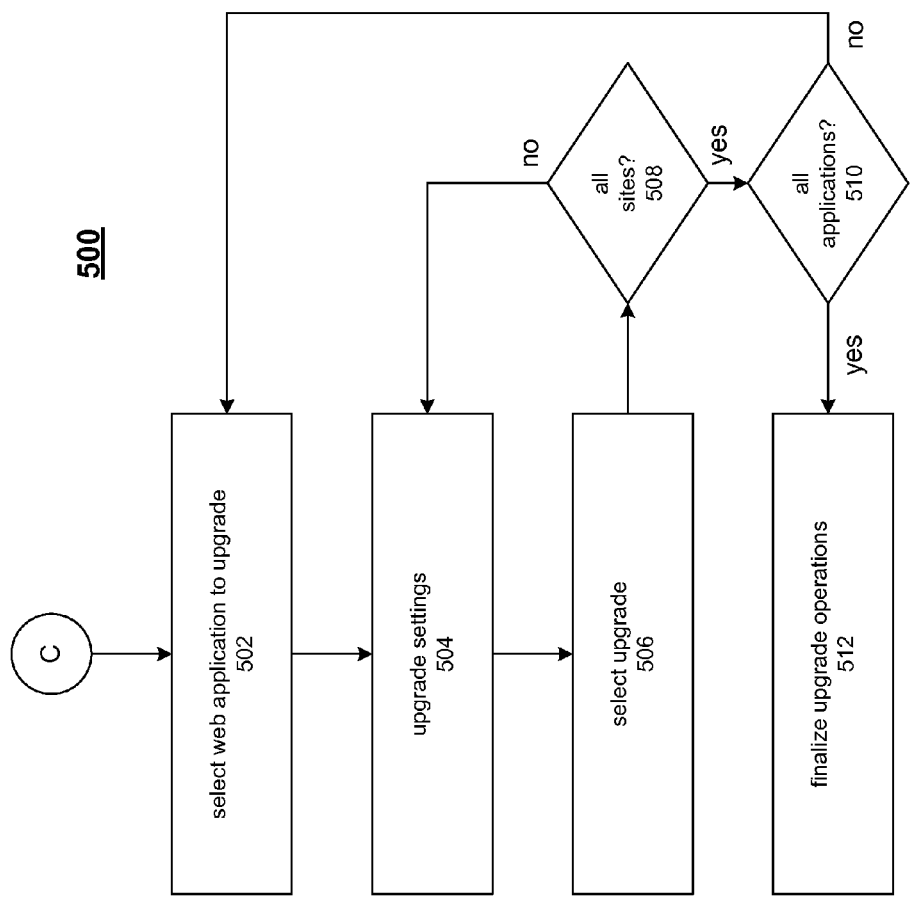
FIG. 5 illustrates an exemplary embodiment of a fourth logic flow.

FIG. 5 illustrates an exemplary embodiment of a fourth logic flow. FIG. 5 illustrates a logic flow 500 that may be representative of central administration and application program upgrade operations. As shown in logic flow 500, a web application may be selected for upgrade at block 502. Application program upgrade operations may include, for example, moving WSS Version 2.0 to a new URL domain, creating or instantiating a WSS Version 3.0 web application on computing device 122-1, creating or instantiating various databases for WSS Version 3.0 to mirror the existing databases used by WSS Version 2.0, adding all WSS Version 2.0 sites to the WSS Version 3.0 configuration database (e.g., configuration database 126*b*), creating a redirect for all sites, and/or other upgrade operations as desired for a given implementation.

Continuing with logic flow 500, various upgrade settings may be defined, modified, updated, or set at block 504. Examples of such settings may include a Reghost and Partner settings. The Reghost setting may allow an administrator to enable reghosting operations during upgrade operations. For example, the administrator may desire to enable reghosting operations in order to reghost customized web pages during upgrade operations. The Partner setting may enable partners and third parties to build upgrade elements on top of the WSS gradual upgrade.

Once the upgrade settings have been set, one or more groups of SharePoint sites (SPSites) may be selected and upgraded at block 506. A determination may be made as to whether all SPSites have been upgraded to WSS Version 3.0 or reverted to WSS Version 2.0 at diamond 508. If all SPSites have not been upgraded or reverted, then control is passed to block 504. If all SPSites have been upgraded or reverted, however, a determination may be made as to whether all application programs have been upgraded for computing device 122-1 at diamond 510. If all application programs have not been upgraded, then control is passed back to block 502. If all application programs have been upgraded, however, then upgrade operations may be finalized at block 512. Examples of finalizing operations may include informing administrator and/or users that the upgrade is a one-way upgrade, providing a confirmation pop-up, disconnecting the WSS Version 3.0 farm from the WSS Version 2.0 farm, cleaning up upgrade working data, and/or other finalizing operations desired for a given implementation.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    installing a new version of an application program onto a computing device;
    converting a data set stored in a database accessible by the computing device for a previous version of said application program to a data schema used by said new version one data segment at a time;
    identifying a domain name for said previous version;
    creating a temporary domain name for said previous version;
    renaming said domain name to said temporary domain name;
    receiving one or more access requests with said domain name for said previous version; and
    redirecting said access requests with said domain name for said previous version to said temporary domain name until said data set has been converted.

2. The method of claim 1, comprising:
    converting a first data segment for said previous version to said data schema; and
    providing access to a second data segment for said previous version while converting said first data segment.

3. The method of claim 1, comprising:
    converting a first data segment for said previous version to said data schema; and
    preventing access to said first data segment during said conversion.

4. The method of claim 1, comprising:
    using said domain name for said new version once said data set has been converted.

5. The method of claim 1, comprising interfacing with other application programs to convert corresponding data sets in accordance with converting said data set for said previous version.

6. The method of claim 1, comprising selecting a data segment having data from one or more content databases used by a web application.

7. The method of claim 1, comprising selecting a data segment having data from one or more content databases used by a hierarchical group of web applications.

8. An article of manufacture comprising a machine-readable storage medium, not comprising a signal, and storing instructions that if executed enable a system to install a new version of an application program, convert a data set for a previous version of said application program to a data schema used by said new version one data segment at a time, identify a domain name for said previous version, create a temporary domain name for said previous version, rename said domain name to said temporary domain name, receive one or more access requests with said domain name for said previous version, and redirect said access requests with said domain name for said previous version to said temporary domain name until said data set has been converted.

9. The article of claim 8, further comprising instructions that if executed enable the system to convert a first data segment for said previous version to said data schema, and provide access to a second data segment for said previous version while converting said first data segment.

10. The article of claim 8, further comprising instructions that if executed enable the system to convert a first data segment for said previous version to said data schema, and prevent access to said first data segment during said conversion.

11. The article of claim 8, further comprising instructions that if executed enable the system to use said domain name for said new version once said data set has been converted.

12. The article of claim 8, further comprising instructions that if executed enable the system to select a data segment having data from one or more content databases used by a web application.

13. An apparatus, comprising:
    a database with a data set for a first version of an application program;
    a computing device to couple to said database, said computing device having a processor and memory, said memory to store a first version of an application program, an installer program, and a gradual update engine; and
    said processor to execute said installer program to install a second version of said application program, and said gradual update engine to convert said data set to a data schema used by said second version one data segment at a time, said gradual update engine to receive one or more access requests with a first domain name for said first version during conversion operations, and redirect said access requests with said first domain name for said first version to a second domain name for said first version during conversion operations until said data set has been converted.

14. The apparatus of claim 13, said gradual update engine to provide access to one data segment while converting another data segment.

15. The apparatus of claim 13, said gradual update engine to lock a data segment during conversion to prevent write access to said data segment.

16. The apparatus of claim 13, said gradual update engine to select a data segment having data from one or more content databases used by a web application.

* * * * *